United States Patent
Holroyd et al.

[11] 3,898,121
[45] Aug. 5, 1975

[54] APPARATUS FOR MOLDING HOLLOW RUBBER ARTICLES

[75] Inventors: Eric Holroyd, High Legh Park, nr. Knutsford; Anthony G. Goodfellow, Maghull, nr. Liverpool; James N. McGlashen, Winstanley, nr. Wigan, all of England

[73] Assignee: Dunlop Limited, Birmingham, England

[22] Filed: Sept. 19, 1973

[21] Appl. No.: 398,699

Related U.S. Application Data

[62] Division of Ser. No. 198,812, Nov. 15, 1971.

[30] Foreign Application Priority Data
Nov. 23, 1970 United Kingdom............. 55586/70

[52] U.S. Cl. ............... 156/500; 156/244; 156/381; 156/394; 156/556; 156/580; 425/242; 425/395
[51] Int. Cl. ............................................. B29c 3/04
[58] Field of Search .......... 425/207, 209, 242, 395; 156/500, 381, 580, 244, 245, 556, 394

[56] References Cited
UNITED STATES PATENTS
| | | | |
|---|---|---|---|
| 3,327,355 | 6/1967 | Carlin | 425/DIG. 228 |
| 3,342,913 | 9/1967 | Engel | 425/207 X |
| 3,764,248 | 10/1973 | Hall | 425/DIG. 228 |

*Primary Examiner*—Edward G. Whitby
*Attorney, Agent, or Firm*—Stevens, Davis, Miller & Mosher

[57] ABSTRACT

An apparatus for molding a hollow rubber article in a pair of female molding cavities, the apparatus having means to pre-work the rubber without curing before the molding step, the mold cavities having locking sprue grooves and the mold having means to pressurize it with gas and means to bring the mold cavities together to join the parts of the article. The apparatus enables satisfactory joining of the article parts without need for adhesive or undue pressure at joining stage.

11 Claims, 19 Drawing Figures

APPARATUS FOR MOLDING HOLLOW RUBBER ARTICLES

This is a division of application Ser. No. 198,812 filed Nov. 15, 1971.

This invention relates to an apparatus for the moulding of articles from flowable, curable elastomeric materials, i.e. rubbery materials. It is concerned in one aspect with a molding apparatus in which an article is formed by the joining together in a mould two or more separately formed parts. In another aspect, the invention is concerned to provide an apparatus having a means of locating and retaining the separately formed parts within the mould so that they are not displaced in an undesired manner before being joined together.

The invention is particularly concerned to provide a satisfactory means of moulding hollow rubber articles, for example hoses, tyres and playballs, e.g. squash ball and tennis ball cores. Thus it will be appreciated that the invention is not limited to an apparatus for the manufacture of completely enclosed hollow articles but is also applicable to articles, e.g. hoses, that cannot conveniently be made as a unitary moulding.

There are many difficulties and disadvantages in conventional techniques for forming many types of hollow rubber articles. For example, semi-solid or "cushion" tyres are conventionally made by extruding a, for example, circular cross-sectioned strip of the desired rubber composition containing an off-centre bore. The strip is cut to the desired length and the ends of each length are joined together to form a tyre. The bore then forms a hollow enclosed passage inside the otherwise solid body of the tyre. This type of extrusion is difficult to control. It is also disadvantageous to form a tyre by bending a strip into a circle since the inner circumference of the tyre will be under compression and the outer circumference will be stretched. Similarly the moulding of tennis ball cores has a number of disadvantageous steps. These cores are conventionally made by moulding two separate hemispherical rubber halves, removing the halves from the mould, buffing and applying adhesive to the rims of the halves, assembling pairs of adhesive-coated halves in a further mould and then securely joining them together.

The present invention aims to provide an improved type of molding apparatus which can be applied to a wide variety of enclosed and non-enclosed hollow articles and which can eliminate many of the difficulties and time-consuming steps of prior art manufacturing methods.

Accordingly the invention provides a molding apparatus comprising at least one pair of female mold cavities, means to form molded halves of rubber in those cavities, the cavities being provided with locking sprue grooves to prevent displacement of the halves, means to pre-work the rubber without any substantial curing prior to its being formed, means to pressurize the mold with gas and means to bring each pair of female mold cavities together to join their respective rubber halves together.

The rubber may be any elastomeric, cross-linkable polymeric material, for example natural rubber, butyl-rubber, S.B.R., neoprene, ethylene-propylene rubber and nitrile rubber. The type of rubber used will of course depend on the desired properties of the finished article and the selection of a suitable rubber for any particular purpose is a well known procedure in the field of rubber technology.

Although the rubber is to be substantially uncured when used to form the halves, it is preferred to subject it to a certain amount of working prior to the forming steps in order to destroy its "nerve" or "memory". Suitable working may be, for example, by milling, extrusion or other mechanical or heat treatment but should not be sufficient to start the rubber on its curing cycle. In other words, although the rubber may have been subjected to a certain amount of energy, it is still substantially uncured when used to form the halves.

By the term "halves" in this specification is meant to embrace both uniform and non-uniform halves. Also it will be apparent that the apparatus of the invention is applicable to the manufacture of article made from three or more parts as well as to articles made from two parts. Nevertheless it will be appreciated that uniform articles like cushion tyres and tennis ball cores are most conveniently made by joining together two substantially identical parts.

The mould is conveniently pressurised by the introduction of compressed air or other suitable gas, e.g. nitrogen. It is preferred to pressurise the mould by at least 5 pounds per square inch (p.s.i) but considerably higher pressures may be used in certain circumstances. For example, where a completely enclosed hollow article is being made, it may be advantageous to make the finished article a pressurised article. Thus, for example, an inflated semi-solid or cushion tyre or a pressurised tennis ball core can be made by joining the halves together under a suitable gas pressure. In order to obtain a satisfactorily pressurised tennis ball core, the mould can conveniently be pressurised by up to 25 p.s.i. prior to joining the halves. Even higher pressures may be desirable, e.g. for tyres.

It will normally be convenient to pressurise the mould by allowing the gas under pressure to enter over the equator of the mould cavities. However, if male formers are used in conjunction with the mould cavities, it may in certain applications be advantageous to introduce the gas through the male formers, e.g. at their poles.

The moulding of the halves into the female mould cavities may be carried out in any convenient manner. For example, male-plug forming, vacuum-forming and combinations of these two techniques may be used for sheet materials. moreover, the moulding may be carried out by compression, transfer or injection moulding techniques.

The means to pre-work the rubber prior to forming may conveniently be the injection screw of an injection mould or the transferring action of a transfer mould. A combination of the two techniques can be employed whereby a transfer chamber is applied by a relatively low-temperature screw. For this reason compression moulding alone is not preferred for the method of the invention but it can be satisfactory if the rubber can be "worked" to the desired degree prior to being charged into the compression mould.

The locking sprue grooves will be so shaped as to result in the formation of sprues which resist movement of the halves in the mould, for example due to shrinkage or to removal of male formers when the latter are used. The locking sprue may also be shaped to ensure that the compressed gas entering the mould passes over the lip and onto the surface of the moulded half which is to be the interior of the article but does not enter between the half and the wall of the female moulding cavity. This latter effect is undersirable since it causes blistering or similar blemishes on the product and can result in quite unsatisfactory products.

A particularly convenient form of locking sprue is one which consists of a thicker portion connected to the half of the article by a thinner portion. Examples of suitable locking sprues are shown in FIGS. 1, 2 and 3 of the accompanying drawings and are described more fully below.

We have discovered that, as the two parts of the article to be joined together are formed of rubber, it is necessary to provide an apparatus in which it is possible to ensure that the rubber is not cured to any appreciable extent prior to the joining stage or the parts will not satisfactorily join together. However a certain amount of prior working of the rubber is, as indicated above, desirable provided that it does not cause any curing of the rubber. The amount of prior working that can safely be used will of course depend on the particular rubber composition being employed but it is a fairly routine matter to ensure that for any particular system the parts are not cured prior to joining.

The apparatus of the invention enables uncured halves to be formed and then brought together without damage. If these uncured halves were formed without the apparatus of the present invention they would be very susceptible to damage and dislodgement. For example, the uncured halves would tend to stick to make formers as the latter were removed thereby resulting in unsatisfactory moulding. The apparatus of the invention overcomes these difficulties as explained more fully below and enables satisfactory, unblemished mouldings to be achieved from substantially uncured halves. Prior means of overcoming this problem have usually required at least partial curing of the halves to prevent their being damaged. These partially cured halves cannot then be satisfactorily joined together unless adhesive is used. The halves have then to be removed from the mould, adhesive applied and the adhesive-coated halves relocated in a mould and joined together. The present invention eliminates all these difficulties and extra steps.

A further advantage is that because the apparatus is designed to ensure that the halves are brought together before any curing has commenced, they will be amenable to joining together i.e. the desired article can be formed, with a relatively low degree of mould pressure. It will be appreciated that many articles, e.g. tennis ball cores, should have walls of uniform thickness and that excess pressure used at the formation of the joint could result in an unacceptable product. In other words excess pressure can cause undesirable wall-thickening in the area of the joint.

As indicated above, where uncured halves are moulded, there will be a very strong tendency for them to be displaced or torn before they can be joined together, for example, they will tend to stick to the male formers when the latter are removed. Thus the positive means i.e. locking sprues, of retaining the halves in their respective cavities which are provided by the invention are very important. This technique can be further assisted by coating male formers, when they are used, with a suitable non-stick material e.g. poly (tetrafluoroethylene).

Moreover, pressurised gas may be introduced into the mould at any convenient stage prior to the joining together of the two halves. However, it is advantageous to introduce the pressurised gas at an early stage in the moulding process and so it is preferred to introduce it shortly after the formation of the separate halves. Thus, where as in the preferred embodiment, the halves are formed between male formers and the female cavitied moulds, it is advantageous to introduce the pressurised gas before or as the male formers are removed from contact with the moulded halves.

Thus it will be seen that the combined use of a specially shaped locking sprue groove and the means to introduce gas under pressure ensures that the uncured halves are held in position in the female formers while the male formers are removed. Any tendency of the halves to stick to the male formers and thereby be dislodged by them can therefore be overcome and an unspoiled and uninterrupted moulding cycle be obtained. Furthermore, by virtue of the shape of the sprues, the gas does not get behind the moulded halves and cause unwanted blemishes.

The apparatus of the invention can with advantage be employed to mould many different hollow rubber articles, both enclosed and unenclosed. Examples of typical articles include playballs, hose and tap connectors, i.e. hose-to-hose and tap-to-hose connectors including branched T-piece units; complete self-connecting hose units, e.g. water hoses, car radiator and heater hoses not requiring special clips inner tubes; tyres, e.g. semi-solid tyres; rotary oil seals; self-contained pump units; spark plug connectors; bellows dust covers; hot-water bottles; hollow springs e.g. suspension mountings such as for engines, ballcocks; buoys and floats; fenders; energy-absorbing devices and rubber gloves. Many other applications of the invention where shaped rubber mouldings are required are also possible.

Various embodiments of the invention are illustrated in the accompanying drawings in which.

Figure 1:
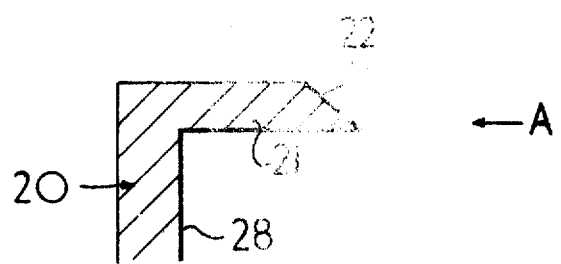
FIGS. 1, 2 and 3 are cross-sections through examples of suitably shaped sprues.

In FIG. 1 the moulded half 20 is formed having a sprue 21. Sprue 21 has a cut-away surface 22 so inclined that pressurised gas introduced into the mould in the direction of arrow A will deflect over the cut-away surface and thereby will not get between the moulded half and the surface of the mould itself, i.e. the tendency for the gas to get between surface 28 i.e.

the exterior of the finished product, of the moulded half and the surface of the mould itself is effectively reduced.

Figure 2:
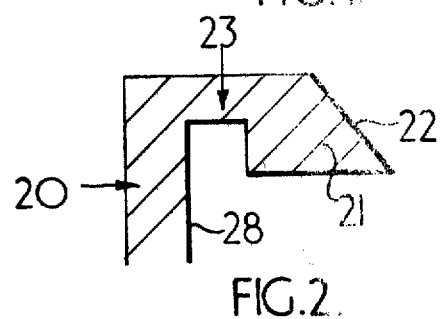

In FIG. 2 is shown a differently shaped sprue. This sprue is connected to the moulded half 20 by means of a narrow moulded portion or neck 23. Trimming of the finished moulded product is made easier by virtue of this narrow portion 23. Again the sprue has a cut-away surface 22 to control the flow of gas into the moulding.

Figure 3:
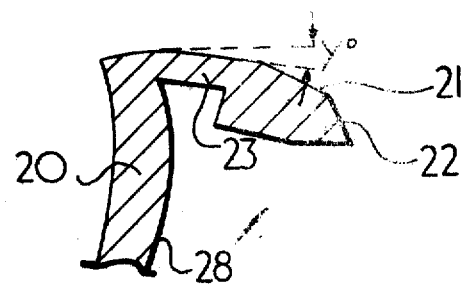

FIG. 3 shows a particularly preferred type of sprue. This has all the features of the sprue of FIG. 2 but has been formed at a small angle X° from the normal with the moulded half. X° can conveniently be up to 45°. By this means the two sprues are prevented from joining together when the two halves are joined together. Joining together of the two sprues may cause undesirable joint deformation.

Figure 4:
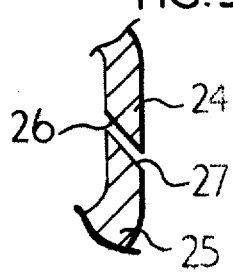
FIG. 4 is a cross-section through part of two moulded halves and illustrating a scarf joint.

FIG. 4 shows a section through part of two moulded halves about to be joined together. Halves 24 and 25, with their sprues not shown have angled faces 26 and 27, thereby forming a scarf joint in the product.

Figure 5:
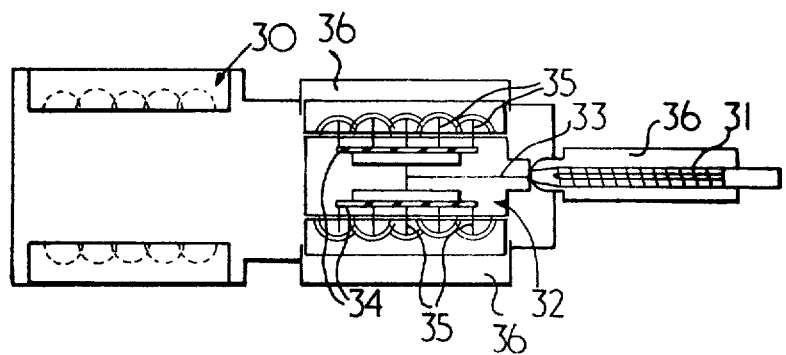
FIGS. 5 and 6 are diagrammatic illustrations of one means of pre-working the rubber composition prior to moulding the halves.
Figure 6:
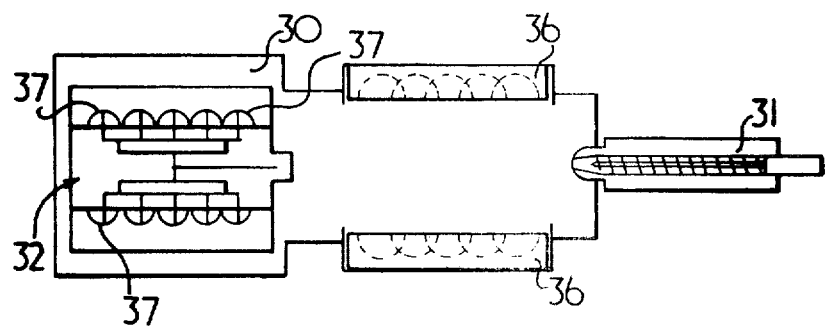

FIGS. 5 and 6 show a suitable "pre-working" arrangement in which the rubber to be formed is fed to the press mould 30 via a screw-feed 31 and a transfer mould 32. The rubber composition 33 is fed by the screw 31 to fill the transfer chambers 34 and ports 35 of the transfer mould 32. The rubber is kept below its curing temperature during this operation by means of "heatsinks" or cooling chambers 36. For example any heat generated can be carried away here by a liquid coolant. FIG. 5 shows the stage at which the transfer chambers and ports have been filled with the rubber composition from the screw-feed. FIG. 6 shows the next stage in which the transfer mould 32 is moved into position in the press mould 30 and the press has been closed, thereby transferring the rubber composition into mould cavities 37 of the press mould. By this means the halves of the desired article are formed from substantially uncured rubber, but the rubber has received the desired preworking before being moulded. The transfer mould can then be removed after pressurising the press mould and the halves joined together in the manner described above.

Figure 7:
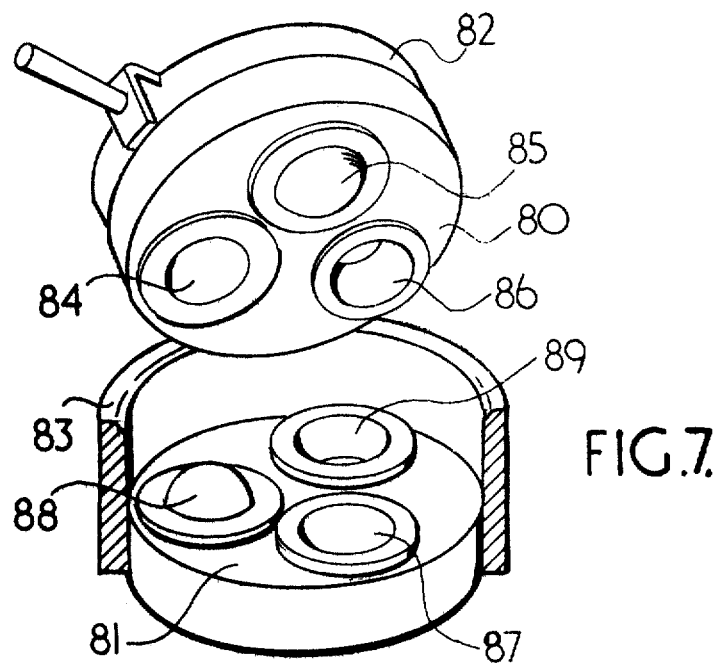
FIGS. 7 and 8 are perspective views of a rotary mould, with parts cut away, illustrating the two forming positions in which the halves are first formed and are then joined together.
Figure 8:
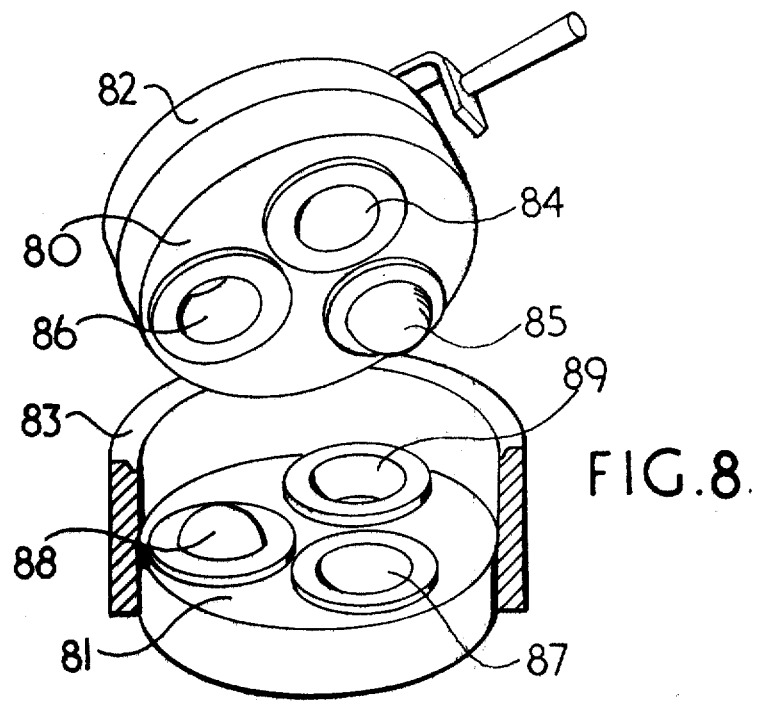

The rotatable mould shown in FIGS. 7 and 8 consists of an upper mould platen 80, a lower mould platen 81, a transfer chamber 82 and a pressure sleeve 83. Upper mould platen 80 contains a female mould cavity 84, a male former 85 and a blank cavity 86. Lower mould platen 81 similarly contains a female mould cavity 87, a male former 88 and a blank cavity 89.

In FIG. 7 the first position of the mould is shown where the mould is just about to be closed prior to the forming of a pair of halves of the desired article. It will be seen that, when closed, mould cavity 84 and male former 88 will come together thereby defining a mould cavity in which one of the halves can be formed. Similarly mould cavity 87 and male former 85 will come together, thereby defining a second mould cavity for the other half to be formed. Thus in order to form the two halves of the article, the mould is closed and the rubber to be formed is introduced into the mould cavities under pressure via transfer chambers 82, (the transfer ports not being shown).

When the two halves have been formed, mould platens 80 and 81 can be rotated with respect to each other until the second position shown in FIG. 8 is reached. In this position it will be seen that, when the mould is closed, the two mould cavities, each now containing a moulded rubber half (not shown), will be brought into contact. Also male formers 85 and 88 will be located in blank cavities 89 and 86 respectively. Thus the mould is then re-closed and the two moulded halves can thereby be joined together and cured. As the mould is contained within pressure-sleeve 83, it can be pressurised at any convenient stage, for example immediately after forming the separate halves. The rotation of the mould platens and the joining together of the halves can therefore be conducted under gas pressure.

It will be appreciated that this type of rotary mould can be enlarged to employ multi-cavity mouldings with automatic or semi-automatic operation.

FIGS. 9 to 16 illustrate a working embodiment based on transfer moulding for making tennis or squash ball cores, although it will be appreciated that the same moulding principles can be applied to many other articles. Two press moulds 40 and 41 are used in succession to give continuous operation. Each press mould contains two opposed sets of female mould cavities 42 carried on upper platen 48 and lower platen 49. Lower platen 49 can be raised towards upper platen 48 by means of ram 50. Two transfer moulding chambers 43 and 44 to carry the rubber charge are each located between two back-to-back sets of male formers 45. These combined chamber-male former transfer units 46, 47 are moveable in and out of moulds 40 and 41 between the opposed sets of female formers 42. Thus when unit 46 is in the "load" or "charge" position between the two moulds 40 and 41, unit 47 is within mould 41. Similarly when unit 47 moves to the charge position, unit 46 moves within mould 40.

Figure 9:
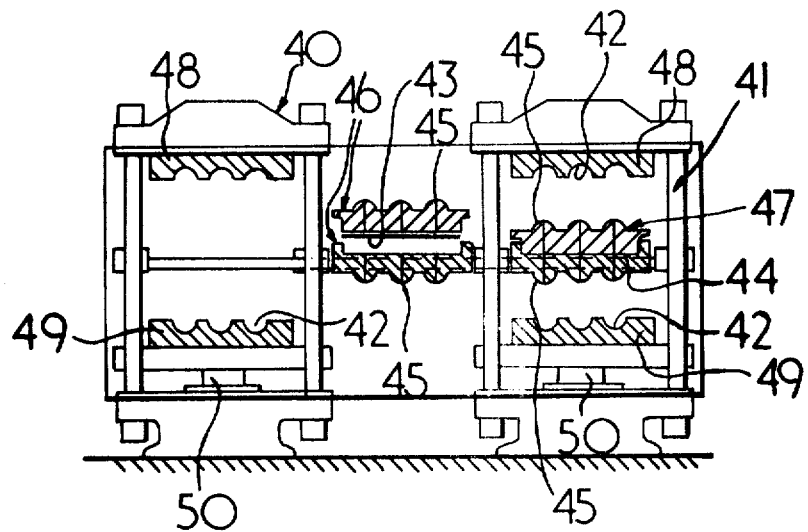
FIGS. 9 to 16 are diagrammatic illustration of the stages in a complete transfer moulding cycle, in which two press moulds are used in sequence for continuous operation.
Figure 10:
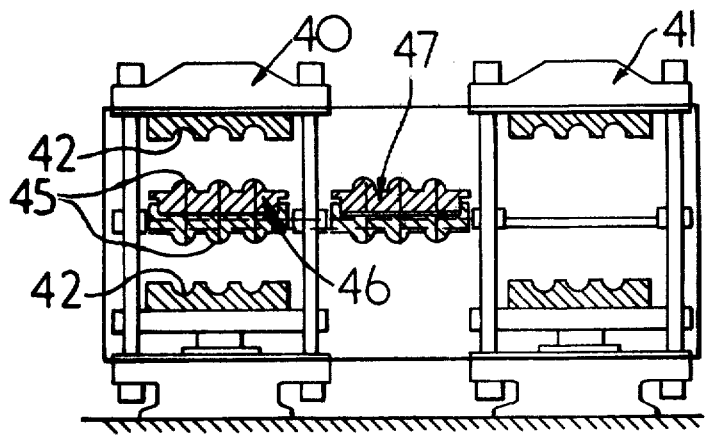
Figure 11:
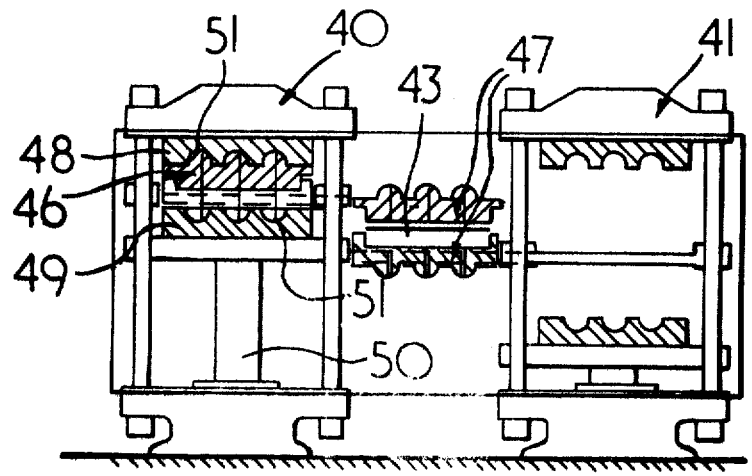

FIG. 9 shows the first stage of process. Transfer unit 47 is empty within mould 41 and transfer unit 46 is being charged with rubber. The means of charging the rubber into the transfer units may be any conventionally used, but a screw-feed as illustrated in FIGS. 5 and 6 is preferred. In FIG. 10, unit 46 has moved into mould 40 and unit 47 is now in position to be charged. In FIG. 11, ram 50 of mould 40 has raised platen 49 of that mould into contact with unit 46 until unit 46 is under pressure between platens 48 and 49. This pressure forces the rubber in transfer chamber 43 to be squeezed into the mould cavities defined between female parts 42 and male formers 45. Thus substantially uncured half shells 51 of the desired article are formed. While this is taking place, chamber 43 of unit 47 is charged with rubber.

Figure 12:
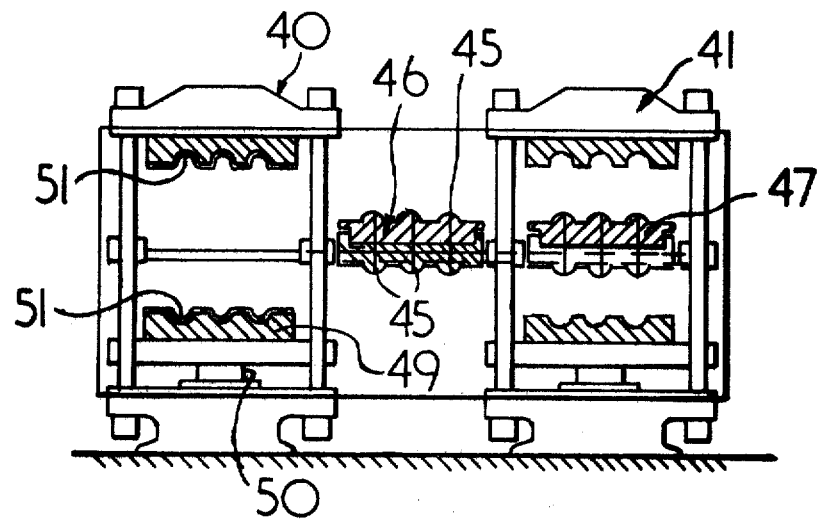

The next stage, FIG. 12 shows mould 40 having been opened by lowering platen 49 by means of ram 50. Transfer unit 46 has been removed empty from mould 40 and charged transfer unit 47 has entered open mould 41. Mould 40 is preferably pressurised between the stages shown in FIGS. 11 and 12, i.e. before the male formers 45 on the transfer unit 46 are removed from contact with the formed halves 51.

Figure 13:
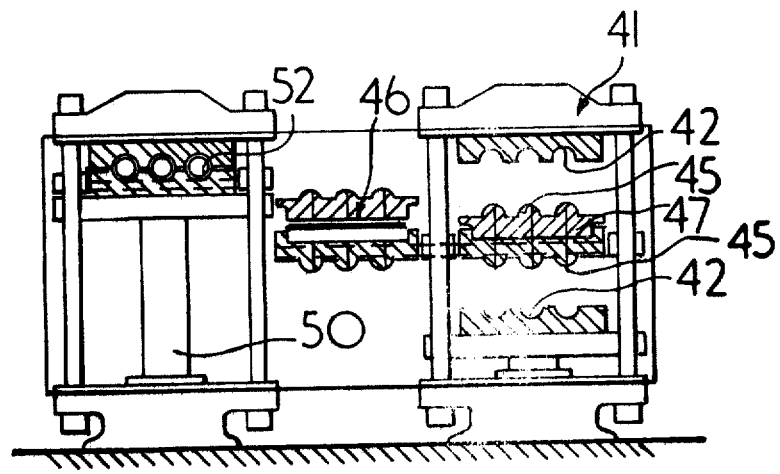

FIG. 13 shows the ram 50 of mould 40 again raising platen 49 but this time into direct contact with upper platen 48. Thus the moulded half-shells 51 are brought together in pairs and the hollow cores 52 so formed are cured. Transfer unit 46 is re-loaded at this stage.

Figure 14:
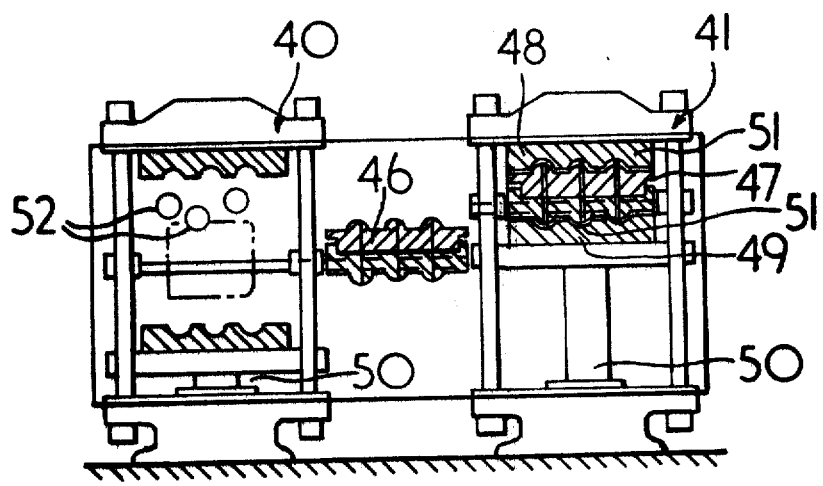

FIG. 14 shows mould 40 being opened by the lowering of ram 50 and the moulded ball cores 52 being extracted. Also at this stage ram 50 of mould 41 raises lower platen 49 of that mould to press unit 47 between platens 48 and 49. Thus half-shells 51 are now formed in mould 41.

Figure 15:
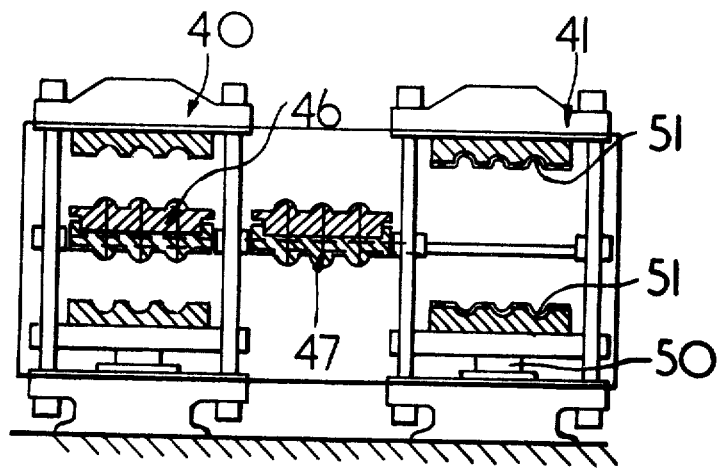

FIG. 15 shows the stage corresponding to FIG. 12 in that ram 50 of mould 41 has now been lowered and unit 47 removed, leaving two opposed sets of moulded half-shells 51 in mould 41. Reloaded unit 46 has been recharged into position in mould 40. Similarly, the mould 41 is preferably pressurised before the unit 47 and its male formers 45 are withdrawn.

Figure 16:
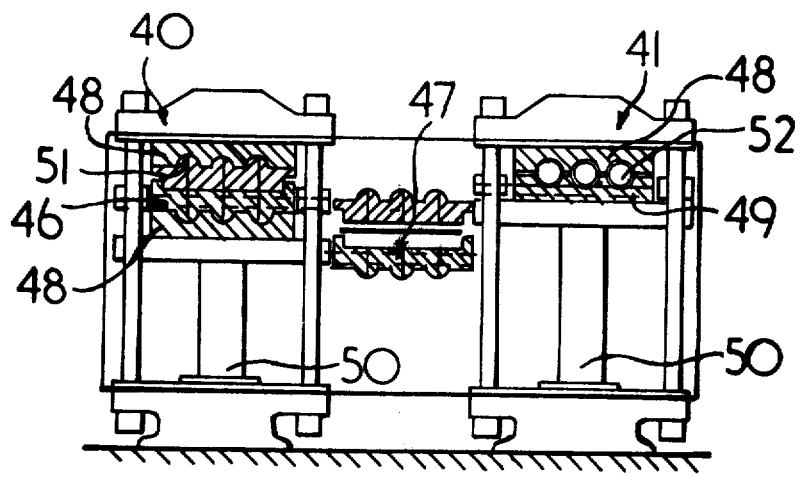

FIG. 16 shows ram 50 of mould 41 raising platen 49 into contact with platen 48 to join the half-shells together into ball cores 52 in that mould. At the same time ram 50 of mould 40 rises to press transfer unit 46 between platens 48 and 49 of that mould. Thus another series of half-shells 51 are formed.

The whole cycle can be repeated continuously. The extracted ball cores are collected and trimmed to remove their sprues (not shown).

Figure 17:
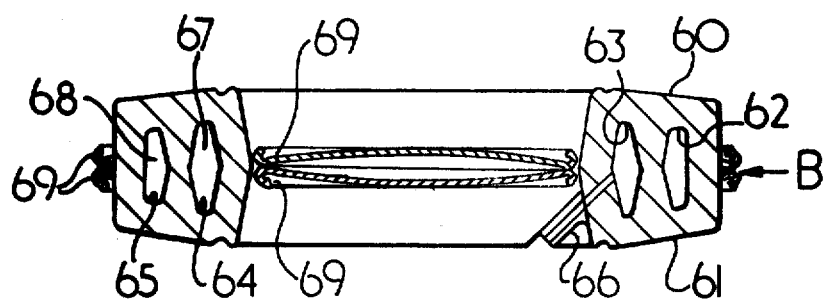
FIG. 17 is a sectioned view of one form of tyre that can be made using an apparatus of the invention.

FIG. 17 shows a section through a diameter of a typical semi-solid or "cushion" tyre that can be made by the apparatus of the invention. The tyre is first moulded as two substantially uncured semi-toroidal halves 60 and 61. Half 60 is formed having, in this particular specific embodiment, two generally U-shaped channels 62 and 63 in its face to be joined to half 61. Half 61 has two corresponding channels 64 and 65 in its face to be joined to half 60. Half 61 additionally contains a valve inlet 66. The two halves 60 and 61 are brought into contact along line B so that the two pairs of U-shaped channels are brought together to form two recesses 67 and 68 running around and inside the tyre. The two halves are then moulded together and vulcanised to form the desired tyre. The sprues 69 around the joint lines are to be trimmed off and if desired one of the recesses 67 can be inflated via valve inlet 66 after insertion of a suitable valve.

Figure 18:
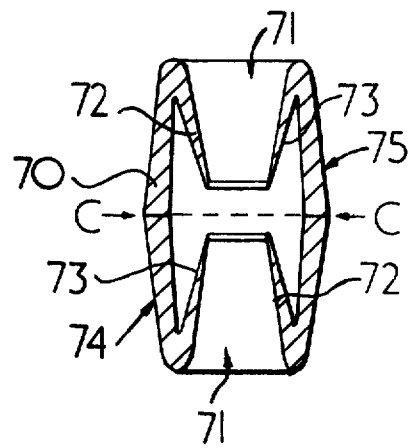
FIG. 18 is a sectioned view of a hose or tap connector that can be made using an apparatus of the invention.

FIG. 18 shows a sectional view of a tap-to-hose or hose-to-hose rubber connector that can also be made by the apparatus of the invention. The connector has a generally barrel-shaped hollow body 70 having a, for example, circular orifice 71 at each end to give access to the interior of the body. Each end of the body is provided with a re-entrant lip-seal portion 72 of generally frusto-conical shape. To connect to a tap or hose, the tap or hose is pushed into orifice 71 so that the lip-seal portion grips tightly onto it. Because of its specially shaped re-entrant lip-seals and because it is formed from resilient rubber no clips are required to secure the connector to a tap or hose. Any medium under pressure, e.g. water, being introduced into the connector via the tap or hose, will tend to exert pressure on the rear surfaces 73, of lip-seals 72, thereby holding the connector firmly in place. Thus, for example, a hosepipe can be firmly attached into one end of the connector and the other end of the connector can be attached to a tap. The connector is moulded in two identical halves 74 and 75 (sprues not shown) and the halves are joined along line C.

Figure 19:
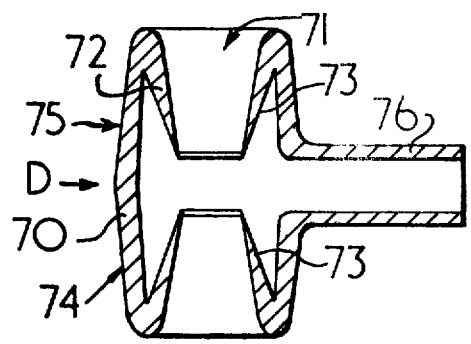
FIG. 19 is a similar view of a modified hose or tap connector.

FIG. 19 shows a section through a similar connector but this time in the form of a T-branch or three-way connector. Thus a branched tube 76 is formed integrally with the body 70 to give three connections, two at orifices 71 and the third at the end of tube 76 remote from body 70. Again the connector is moulded in two identical halves 74 and 75 that are than joined together along line D.

The re-entrant lip-seal portions of these connectors could, if desired, be provided with internally-extending fins or serrations to aid the gripping of the lip-seal onto a tap, hose or the like.

Having now described our invention, what we claim is:

1. A moulding apparatus comprising at least one pair of female mould cavities, means to form moulded halves from rubber in said cavities, said cavities being provided with locking sprue grooves to prevent displacement of said moulded halves, means to mechanically work said rubber without any substantial curing prior to its being formed into said halves, means to pressurise said mould with gas and means to bring each pair of female mould cavities together containing said moulded havles whereby said halves can be joined together under heat and pressure.

2. An apparatus according to claim 1, in which said means to mechanically work said rubber comprises a feederscrew coupled to a transfer moulding chamber through which said rubber is passed prior to being formed in said female mould cavities.

3. An apparatus according to claim 1, in which said pair of female mould cavities are located in a rotary mould, said mould having an upper and a lower platen, each platen containing one of said pair of female mould cavities, a male former and a blank cavity, said mould having two forming positions; in said first forming position the male former of each platen being located within the female mould cavity of the other platen thereby defining the halves to be moulded, and in said second forming position the female mould cavities of the two platens being in correspondence with each other thereby enabling the moulded halves to be joined together, and the male former of each platen being located in the blank cavity of the other platen; said platens being rotatable between said first and second forming positions.

4. An apparatus according to claim 1, in which male formers are provided whereby said rubber halves are formed and defined between said male formers and said female mold cavities.

5. An apparatus according to claim 1, in which said means to form the rubber havles in the female mold cavities is a transfer molding mechanism.

6. An apparatus according to claim 1, in which said means to form the rubber halves in the female mold cavities is an injection molding mechanism.

7. An apparatus according to claim 1, in which said means to form the rubber halves in the female mold cavities is a compression molding mechanism.

8. An apparatus according to claim 1, in which is provided two press molds, each containing two opposed sets of said female cavities, and two feed chambers being provided between said two press molds, each feed chamber being movable in and out of one of the press molds whereby when one feed chamber is located within its press mold the other feed chamber is in the "out" position where it can be charged with rubber.

9. An apparatus according to claim 1, in which said means to pressurize the mold with gas introduces the gas over the equators of the female mold cavities.

10. An apparatus according to claim 1, in which said locking sprue grooves are shaped to give the sprues a cutaway surface whereby gas entering the mold will pass over the lip of the formed half and onto the surface of the half which is to be the interior of the article, but will not enter between the shell and the wall of the mold cavity.

11. An apparatus according to claim 1, in which said locking sprue grooves are shaped to provide a sprue which consists of a thicker portion connected to its half of the article by a thinner portion.

* * * * *